US007336215B2

(12) United States Patent
Marin Palacios et al.

(10) Patent No.: US 7,336,215 B2
(45) Date of Patent: Feb. 26, 2008

(54) ELECTROMAGNETIC RADIATION ABSORBER BASED ON MAGNETIC MICROWIRES

(75) Inventors: Pilar Marin Palacios, Pozuelo de Alarcón (ES); Antonio Hernando Grande, Madrid (ES); Daniel Cortina Blanco, Boadilla del Monte (ES); José Juan Gómez Rebolledo, Madrid (ES); Javier Calvo Robledo, Pozuelo de Alarcón (ES)

(73) Assignee: Micromag 2000 S.L., Madrid (ES)

( * ) Notice: Subject to any disclaimer, the term of this patent is extended or adjusted under 35 U.S.C. 154(b) by 1 day.

(21) Appl. No.: 11/315,645

(22) Filed: Dec. 21, 2005

(65) Prior Publication Data

US 2006/0170583 A1 Aug. 3, 2006

(30) Foreign Application Priority Data

Dec. 24, 2004 (ES) ................................ 200403082

(51) Int. Cl.
*H01Q 17/00* (2006.01)
*G01S 13/00* (2006.01)

(52) U.S. Cl. ................................................ 342/1; 342/4

(58) Field of Classification Search ................. 342/1-4
See application file for complete search history.

(56) References Cited

U.S. PATENT DOCUMENTS 2,436,578 A * 2/1948 Korn et al. .................... 342/2
3,290,680 A * 12/1966 Wesch ........................... 342/1
5,085,931 A * 2/1992 Boyer et al. .................... 342/1
5,866,273 A * 2/1999 Wiggins et al. ................ 342/1
6,538,596 B1 * 3/2003 Gilbert .......................... 342/1
7,136,008 B2 * 11/2006 Aisenbrey ...................... 342/4
7,204,057 B2 * 4/2007 Behrens ......................... 342/4
2002/0011946 A1 * 1/2002 Artis et al. .................... 342/3

* cited by examiner

*Primary Examiner*—Bernarr E. Gregory
(74) *Attorney, Agent, or Firm*—Merchant & Gould P.C.

(57) ABSTRACT

The invention relates to an electromagnetic radiation absorber for a preselected frequency range, comprising:

an absorbent sheet (10) located such that said electromagnetic radiation falls on it, and a conductive base (20) located under said absorbent sheet, wherein said absorbent sheet:

has a total thickness e exceeding $\lambda/(\epsilon)^{1/2}4$, where $\lambda$ is the wavelength of the incident electromagnetic radiation, and is made up of a dielectric material containing amorphous magnetic microwires, the magnetic permeability of which in the preselected frequency range has an imaginary part $\mu''$ which is at least 100 times greater than the corresponding real part $\mu'$, said microwires being distributed in a volume having a thickness $e_2$ of at least $\lambda/(\epsilon)^{1/2}16$, where $\epsilon$ is the dielectric constant of the absorbent sheet and said volume is located a distance $e_3$ from the conductive base that is not less than $\lambda/(\epsilon)^{1/2}8$.

15 Claims, 8 Drawing Sheets

ELECTROMAGNETIC RADIATION ABSORBER BASED ON MAGNETIC MICROWIRES

BACKGROUND OF THE INVENTION (1) Field of the Invention

The present invention refers to an electromagnetic radiation absorber based on magnetic microwires.

The invention is encompassed within the technical field of magnetic materials, also covering aspects of electromagnetism, applicable in the field of magnetic sensors and absorbers and the field of metallurgy.

(2) Description of Related Art

Numerous applications require eliminating reflections from electromagnetic radiation. The large number of electronic systems built into vehicles gives rise to an increase in electromagnetic interferences. This problem includes false images, radar interferences and a decrease in performance due to the coupling between various systems. A microwave absorber might be very effective for eliminating this type of problems. There is even greater interest in reducing the radar cross section of certain systems to prevent or minimize their detection.

Microwave absorbers are carried out by modifying the dielectric properties, or in other words the dielectric permittivity, and magnetic properties, or magnetic permeability, of certain materials. The first case involves dielectric absorbers basing their operation on the quarter wavelength resonance principle. However, the second case involves the absorption of the magnetic component of radiation. The first attempts made to eliminate reflections include Salisbury's screen absorber method, the non-resonant absorber, the resonant absorber, and resonant magnetic ferrite absorbers. In the case of Salisbury's screen (U.S. Pat. No. 2,599,944), a screen with a carefully chosen electrical resistance is placed at the point where the electrical field of the wave is maximum, i.e. at a space equal to a quarter wavelength with respect to the surface which is to be shielded. This method has little practical use since the absorber is too thick and is effective only for excessively narrow frequency bands and variations of angles of incidence.

In non-resonant methods, the radiation traverses a dielectric sheet to be subsequently reflected by the metallic surface. The dielectric sheet is thick enough so that, in the course of its reflection, the wave is sufficiently attenuated before reemerging from the sheet. Since the sheet must be made of a material having low losses at high frequencies and low reflection properties to assure penetration and reflection, the sheet must be very thick so as to effectively attenuate the wave.

In the first resonant methods, materials with high dielectric losses are placed directly on the conductive surface that is to be protected. The dielectric material has an effective thickness, measured inside the material, that is about equal to an even number of quarters of half-wavelengths of the incident radiation. The usefulness of the method is limited due to the large thickness of the dielectric sheet and the narrow absorption band they have, particularly at low frequencies. Attempts have been made to eliminate these deficiencies by dispersing ferromagnetic conductive particles in the dielectric. However, when metallic particles are dispersed, high permeabilities in the order of 10 or 100 are not compatible with low conductivities in the order of $10^{-2}$ or $10^{-8}$ mohm per meter.

Another type of absorbers are those known as ferrite absorbers (U.S. Pat. No. 3,938,152), which have clear advantages in comparison with those already described herein. They function in the form of thin sheets such that they overcome the disadvantages of the large thickness required by dielectric absorbers. They are furthermore effective for frequencies between 10 MHz and 15,000 MHz and dissipate more energy than dielectrics.

The ferrite absorbers developed up until now eliminate reflections by means of insulating or semiconductive ferrite sheets, and particularly ferrimagnetic metal oxides, placed directly on the reflecting surfaces. In these cases the term ferrite refers to ferrimagnetic metal oxides including, but not limited to, compounds such as spinel, garnet, magnetoplumbite and perovskites.

In this type, absorption is of two types, which may or may not occur simultaneously. They are dielectric and magnetic losses. The first losses are due to electron transfer between the cations $Fe^{2+}$ and $Fe^{3+}$, while the losses of the second type originate from the movement and relaxation of magnetic domain spins.

According to certain inventions (U.S. Pat. No. 3,938,152), at low frequencies, generally those in the range between UHF and the L-band, energy is predominantly extracted from the magnetic component of the incident radiation field, whereas at higher frequencies, generally in the L-band and higher, energy is extracted equally from the electric and magnetic components.

This type of absorbers eliminates reflection because the radiation establishes a maximum magnetic field on the conductor surface. In the normal incidence of a planar wave on an ideal conductor total reflection occurs, the reflected intensity being equal to the incident intensity. The incident and reflected waves then come together, generating a standing wave in which the electrical field is nil at the conductor boundary, whereas the magnetic field at this boundary is maximum. There is magnetic field condensation during the maximum possible time. It is therefore necessary, in the case of ferrite, for the incident radiation to traverse the absorbent sheet so as to establish the maximum magnetic field conditions. It has been seen that the complex part of the permeability of certain ferrimagnetic metal oxides varies with frequency, such that it allows obtaining low reflections over very broad frequency ranges without needing to use magnetic absorbers with high thicknesses as in other cases.

Taking into account the reflection coefficient in metals for normal incidence, it is deduced that when working with a thin sheet the reflected wave can be attenuated independently of the electric permittivity of the absorbent material. Minimum reflections will occur at a given frequency if the complex permeability $\mu''$ is substantially greater than the real permeability $\mu'$, provided the product $K\tau \ll 1$, where K is the wave number and $\tau$ is the thickness of the sheet.

Taylor's technique for manufacturing microwires, which allows obtaining microwires with very small diameters comprised between one and several tens of a micron through a simple process, is known. The microwires thus obtained can be made from a wide variety of alloys and magnetic and non-magnetic metals. This technique is described, for example, in the article "*The Preparation, Properties and Applications of Some Glass Coated Metal Filaments Prepared by the Taylor-Wire Process*" W. Donald et al., Journal of Material Science, 31, 1996, pp 1139-1148.

The most important characteristic of the Taylor process is that it allows obtaining metals and alloys in microwire form with an insulating sleeve in a single and simple operation, with the cost-effectiveness that this implies in the manufacturing process.

The technique for obtaining magnetic microwires with an insulating sleeve and amorphous microstructure is described, for example, in the article "*Magnetic Properties of Amorphous Fe_P Alloys Containing Ga, Ge and As*" H. Wiesner and J. Schneider, Stat. Sol. (a) 26, 71 (1974), Phys. Stat. Sol. (a) 26, 71 (1974).

The properties of the magnetic amorphous microwire with an insulating sleeve related to the object of the present invention are described in the article "*Natural ferromagnetic resonance in cast microwires covered by glass insulation*" A. N. Antonenko, S. A. Baranov, V. S. Larin and A. V. Torkunov, Journal of Materials Science and Engineering A (1997) 248-250.

The alloys used for manufacturing the microwire core are of the transition metal-metalloid type, and have an amorphous microstructure. The effect of the microwire geometry on its magnetic performance is due to the magnetoelastic character of the alloys used, which in turn depends on the magnetostriction constant thereof.

BRIEF SUMMARY OF THE INVENTION

According to one aspect of the present invention, the latter relates to an electromagnetic radiation absorber for a preselected frequency range, comprising:

- an absorbent sheet located such that, in the absorber use position, said electromagnetic radiation falls on the absorbent sheet, and
- a conductive base, not necessarily but preferably planar, located under said absorbent sheet in the absorber use position.

Said absorbent sheet:

- has a total thickness e exceeding $\lambda/(\epsilon)^{1/2}4$, where $\lambda$ is the wavelength of the incident electromagnetic radiation, and
- is made up of a dielectric material containing amorphous magnetic microwires, the magnetic permeability of which in the preselected frequency range has an imaginary part $\mu''$ which is at least 100 times greater than that of the corresponding real part $\mu'$, said microwires being distributed in a volume having a thickness $e_2$ of at least $\lambda/(\epsilon)^{1/2}16$, where $\epsilon$ is the dielectric constant of the absorbent sheet, and said volume is located a distance $e_3$ from the conductive base that is not less than $\lambda/(\epsilon)^{1/2}8$ and is insulated from the exterior by a dielectric volume with thickness $e_1$, such that a standing wave with a magnetic field maximum is formed inside said absorbent sheet as a response to said incident radiation.

The frequencies are preferably comprised between 0.5 and 20 GHz.

Electric and magnetic losses are maximal in the volume in which the amorphous magnetic microwires are distributed.

The absorbent sheet is preferably bonded to the conductive base and adapted to its geometry.

The magnetic microwire used in the present invention is preferably a magnetic metallic filament with a Pyrex® sleeve, in which the core and total diameters are not greater than 15 and 100 μm, respectively, and the magnetic properties of which are related to the ratio between these values. This geometry is controlled by adjusting the suitable parameters when the Taylor technique is applied in the manufacturing process.

Said microwires are also preferably made of iron-based alloys and have positive magnetostriction constants. Their fundamental magnetic characteristic is the presence of bistable magnetic behavior characterized by the presence of a sudden jump in magnetization to virtually the saturation magnetization value at a certain value of the applied magnetic field known as the critical or anisotropy field (Ha). As a result of said anisotropy, they exhibit the natural ferromagnetic resonance phenomenon giving rise to a high imaginary part of the magnetic permeability for frequencies comprised between 0.5 and 20 GHz. This means that the magnetic microwire is capable of absorbing the magnetic component of the electromagnetic wave (see Spanish patent application P200302352).

The magnetic microwires used have a high complex part of the magnetic permeability at the frequencies of interest due to the ferromagnetic resonance phenomenon.

Characterization of the Plates

Each and every one of the absorbers object of the present invention have associated thereto a characteristic absorption spectrum.

An absorption spectrum is the graphic representation of the absorption level according to the incident radiation frequency.

The characteristic parameters of the absorption spectrum are the frequency associated to the maximum absorption peak, the absorption level and the bandwidth.

The frequency associated to the maximum absorption peak can be controlled from the imaginary part of the high-frequency magnetic permeability of the magnetic microwires.

The imaginary part of magnetic permeability can be determined from the critical field associated to the bistable hysteresis loop of the microwires measured at a low frequency and can be modified through the composition and geometry of the magnetic microwires.

The absorption bandwidth can be controlled using different microwire proportions with different magnetic properties.

The bandwidth can also be controlled by varying the distance $e_3$ between the conductive base and the microwires.

The absorption level can be controlled from the microwire density contained in the absorbent sheet.

For a given microwire density, control of the thickness $e_2$ of the intermediate region in which the microwires are embedded allows increasing or decreasing the central frequency absorption level at the expense of decreasing or increasing the bandwidth, respectively.

The absorption level can be controlled by increasing the thickness $e_1$ of the dielectric region between the exterior and the microwires.

The increase in thickness $e_1$ allows greater stability of the standing wave inside the absorbent sheet.

The total thickness e of the absorbent sheet can be decreased by increasing its dielectric constant.

The absorber of the invention can be carried out on different substrates provided that the dielectric constant thereof, the magnetic behavior of the microwires and the geometry thereof are suitably adjusted.

That is, the invention refers to an electromagnetic radiation absorber (for frequencies comprised between 0.5 and 20 GHz) in which a certain amount of amorphous magnetic microwires (the complex component $\mu''$ of the permeability of which reaches maximum values for said GHz frequency interval) is added to a dielectric support of known structural and dielectric characteristics.

BRIEF DESCRIPTION OF THE DRAWINGS

Briefly described below are a series of drawings aiding to better understand the invention and expressly related to an embodiment of said invention, presented as an illustrative and non-limiting example thereof.

FIG. 1_b_ shows a diagram of an absorber with a curved geometry according to another possible embodiment of the present invention.

FIG. 4_b_ shows the characteristic curves of plates made with each type of microwire a)-d) of FIG. 4_a_.

DETAILED DESCRIPTION OF THE INVENTION

Figure 1A:
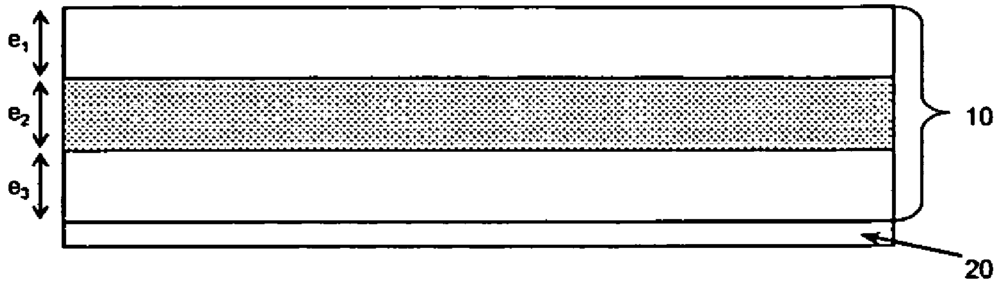
FIG. 1_a_ shows a diagram of an absorber with a planar geometry according to a possible embodiment of the present invention.
Figure 1B:
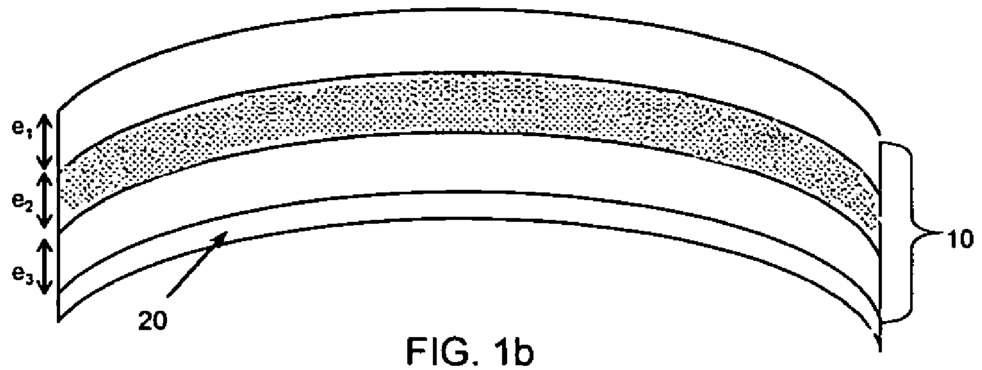

FIG. 1_a_ shows a diagram of an absorber, in this case, an absorption plate in which the absorbent sheet 10 (or dielectric support) and metallic sheet 20 are distinguished.

The absorbent sheet is characterized by a given dielectric constant and has thickness e, which is divided into three regions of thicknesses $e_1$, $e_2$ and $e_3$, respectively. The intermediate region of thickness $e_2$ contains the microwires in the suitable percentage and with optimal magnetic and geometric (diameter and length) properties. Optimization of the absorption properties of the sheet is conditioned to the adjustment of said thicknesses. Said thicknesses are in turn conditioned by the dielectric constant of each and every one of the sheets.

FIG. 1_b_ shows a similar diagram to that of FIG. 1_a_, but for another type of geometry.

The absorption spectrum associated to each absorber is characterized by three fundamental parameters: frequency associated to the maximum absorption peak $f_{max\ abs.}$, bandwidth BW and maximum absorption level $dB_{max}$. The first and second parameters refer to the frequency interval object of shielding and the third parameter to the percentage of radiation absorbed by the plate.

Figure 2:
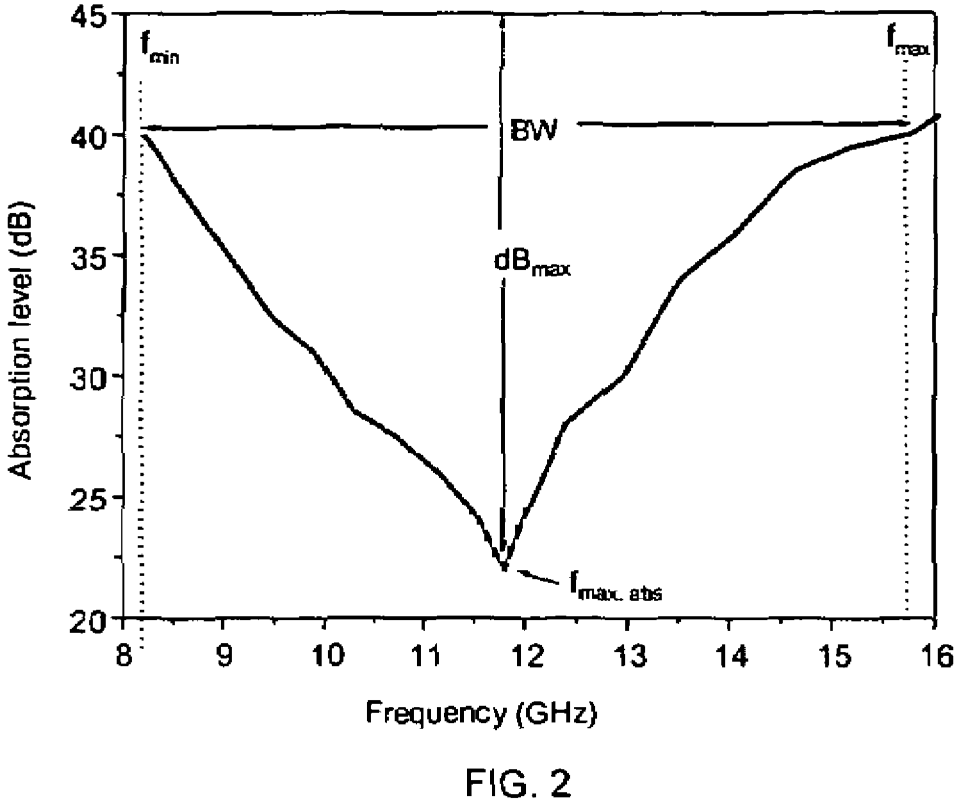
FIG. 2 shows the characteristic curve associated to each absorber in which the absorption level is represented according to frequency and its corresponding parameters are shown.

As shown in FIG. 2, the characteristic curve of each absorption plate is obtained in normal radiation incidence in an anechoic chamber, and it is the graphic representation of the absorption level expressed in decibels (y-axis) according to the radiation frequency in GHz (x-axis).

An anechoic chamber is understood to be a room which, by its construction, must simulate the characteristics of free space in terms of electromagnetic radiations and must be isolated from interferences of an external origin, and it cannot have any other object that may reflect the disturbances. The usual basis of an anechoic chamber is a Faraday chamber which is covered with absorbent materials.

Control of the characteristic curve of each plate is linked to the following parameters: composition and geometry of the microwire used, dielectric constant of the three regions in which the absorbent sheet is divided, thickness of said regions, microwire density.

Figure 3A:
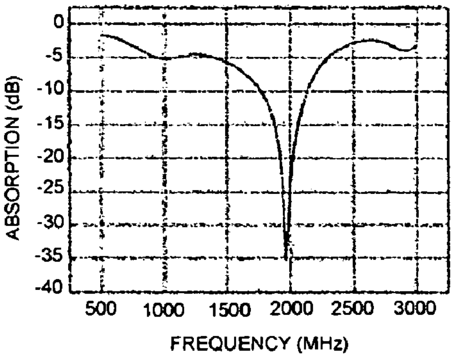
FIGS. 3_a_ and 3_b_ show the characteristic curve of a planar absorber carried out with microwires with low magnetostriction and high magnetostriction, respectively.
Figure 3B:
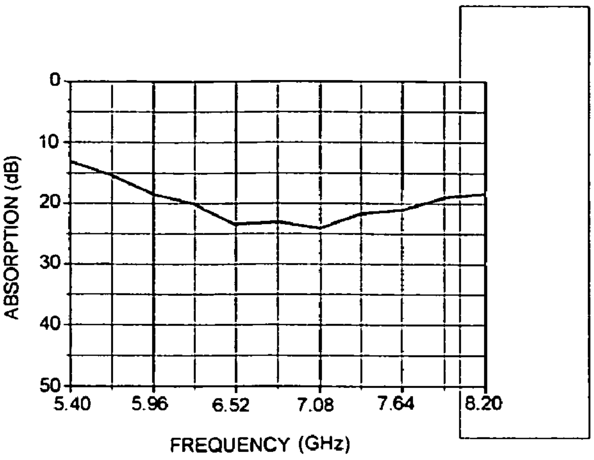

The frequency associated to the maximum absorption peak $f_{max\ abs}$. of the characteristic curve is determined in a first approximation by the composition of the microwire through the dielectric constant thereof. As is shown in FIG. 3, corresponding to plates with a surface area of 50×50 $cm^2$ and thickness of approximately 2 mm made from dielectric fiberglass supports using 10 grams of microwire per plate, microwires with low magnetostriction and rich in cobalt are used in the case of low-frequency shielding (between 0.5 and 5 GHz). Microwires rich in iron and with a higher magnetostriction constant are used when frequency intervals are greater than 5 GHz.

Figure 4A:
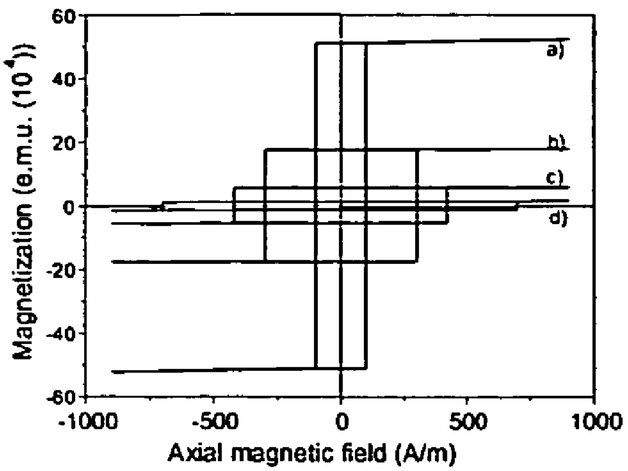
FIG. 4_a_ shows the hysteresis loops associated to a microwire with a composition of FeSiBCMn with different metallic core diameters.
Figure 4B:
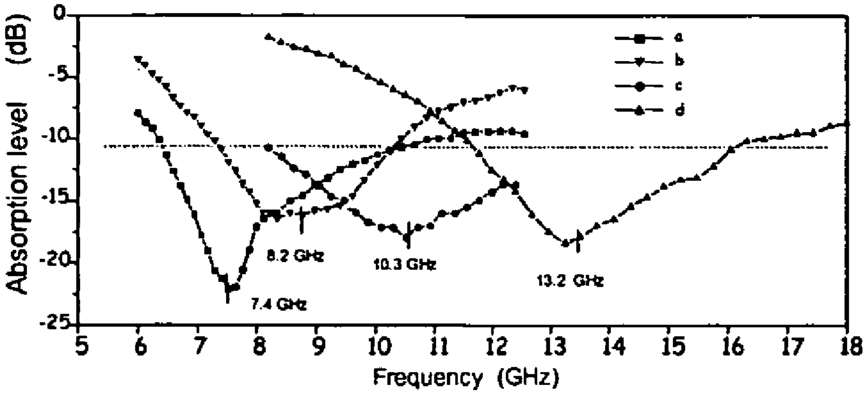

Having chosen the microwire core composition, the maximum absorption peak can be centered at any more or less exact position by controlling the ratio of the metal core diameters and the Pyrex sleeve (core diameter-total diameter ratio). As is shown in FIGS. 4_a_-4_b_, corresponding to plates with a surface area of 50×50 $cm^2$ and a thickness of approximately 2 mm made from a dielectric silicone support using 10 grams of microwire per plate, distributed in the entire volume thereof, the smaller the metal core diameter, the larger the anisotropy field and the greater the ferromagnetic resonance frequency.

Figure 5:
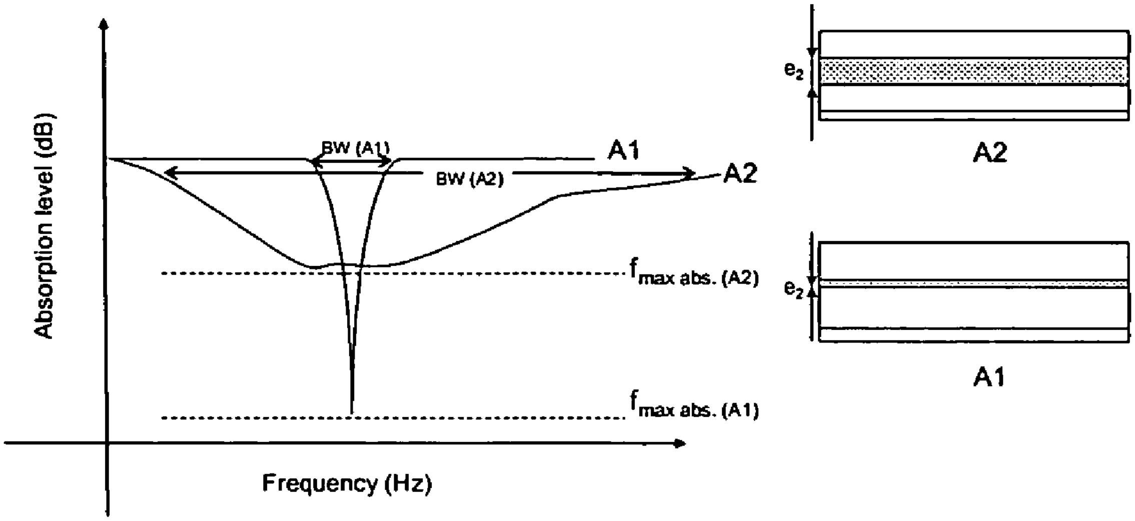
FIG. 5 shows the effect of the thickness of the intermediate region of the absorbent sheet on the characteristic curve of absorption plates for the same type and the same amount of microwire.

The absorption bandwidth is controlled, for a certain type of microwires and for a certain dielectric constant or constants of the support, from the thickness $e_2$ of the second region. Very thin thicknesses allow obtaining high absorption levels but very narrow bandwidths. The increase in thickness leads to obtaining greater bandwidths with smaller absorption levels (see FIG. 5).

Figure 6:
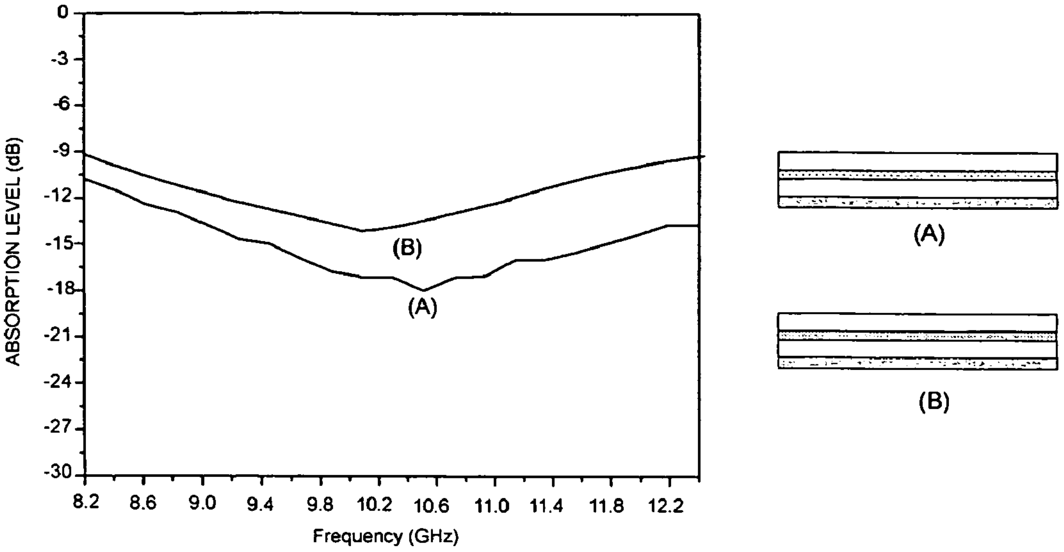
FIG. 6 shows the effect of the amount of microwire per unit of volume on the characteristic curve of absorption plates with equal geometric parameters and for the same type of microwire.

FIG. 6, corresponding to two plates with a surface area of 50×50 $cm^2$ and thickness of approximately 2 mm carried out on dielectric silicone supports using 10 and 20 grams of microwire per plate, respectively, shows how the absorption level can be controlled from the density of the microwire contained in the sheet.

Figure 7:
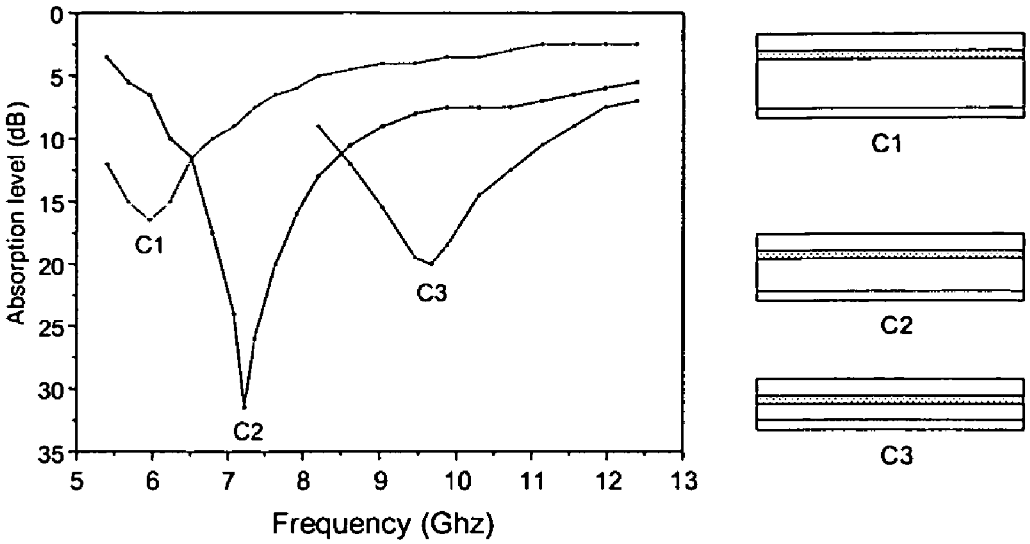
FIG. 7 shows the effect of the distance $e_3$ on the absorption curve for three plates with the same type and same amount of microwire. The thicknesses $e_2$ and $e_1$ are maintained constant.

The bandwidth and final position of the maximum absorption peak can also be controlled by varying $e_3$. FIG. 7, corresponding to plates with a surface area of 50×50 $cm^2$ and thicknesses of 2.767, 3.800 and 4.502 mm, respectively, made from a dielectric fiberglass support using 10 grams of microwire per plate, shows the effect of $e_3$ on the absorption spectrum of the plates.

Having established a bandwidth and a position of the maximum absorption peak, the absorption level can be improved by increasing the thickness of the third region, the dielectric constant of which must be the same as that of the second region.

Figure 8:
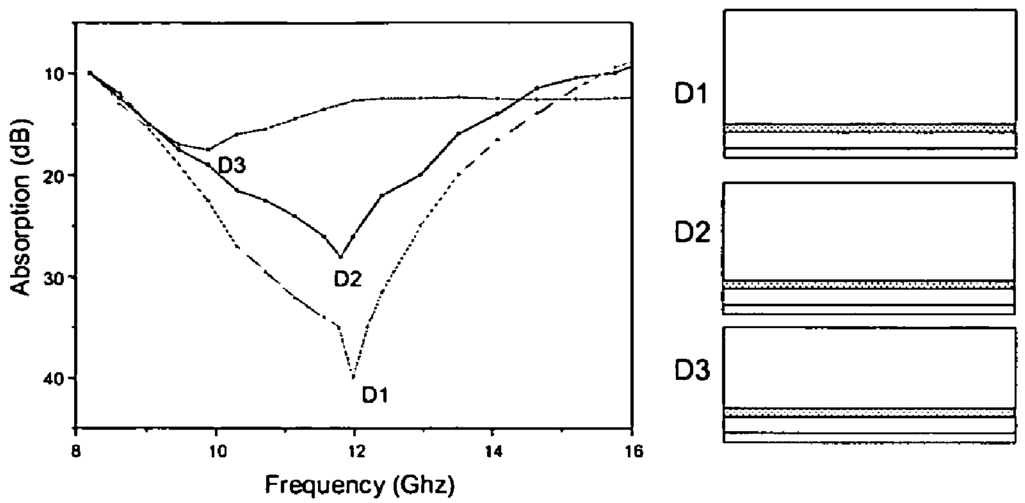
FIG. 8 shows the effect of the thickness $e_1$ on the absorption curve for three plates with the same type and amount of microwire. The thicknesses $e_2$ and $e_3$ are maintained constant.

FIG. 8, corresponding to plates with a surface area of 50×50 $cm^2$ and thicknesses of 5.762, 5.750 and 4.382 mm, respectively, carried out on a dielectric fiberglass support using 10 grams of microwire per plate, shows the effect of $e_1$ on the absorption spectrum of the plates.

The invention claimed is:

1. An electromagnetic radiation absorber for a preselected frequency range, comprising:

an absorbent sheet located such that said electromagnetic radiation falls on the absorbent sheet, and a conductive base located under said absorbent sheet, wherein said absorbent sheet:

has a total thickness e exceeding $\lambda/(\epsilon)^{1/2}4$, where $\lambda$ is the wavelength of the incident electromagnetic radiation, and is made up of a dielectric material containing amorphous magnetic microwires, the magnetic permeability of which in the preselected frequency range has an imaginary part $\mu''$ which is at least 100 times greater than the corresponding real part $\mu'$, said microwires being distributed in a volume having a thickness $e_2$ of at least $\lambda/(\epsilon)^{1/2}16$, where $\epsilon$ is the dielectric constant of the absorbent sheet and said volume is located a distance $e_3$ from the conductive base that is not less than $\lambda/(\epsilon)^{1/2}8$, such that a standing wave with a magnetic field maximum is established inside said absorbent sheet as a response to said incident radiation.

2. An absorber according to claim 1, wherein said microwires are made of iron-based alloys.

3. An absorber according to claim 1, wherein the microwires used have positive magnetostriction constants.

4. An absorber according to claim 1, wherein said absorbent sheet is bonded to the conductive base.

5. An absorber according to claim 1, wherein the frequency associated to the maximum absorption peak $f_{max\ abs.}$ is controlled from the imaginary part of the high-frequency with a range between about 0.5 GHz and about 20 GHz magnetic permeability of the magnetic microwires.

6. An absorber according to claim 5, wherein the imaginary part of the magnetic permeability is determined from the critical field associated to the bistable hysteresis loop of the microwires.

7. An absorber according to claim 6, wherein the critical field associated to the bistable hysteresis loop of the microwires is modified through the composition and geometry of the magnetic microwires.

8. An absorber according to claim 1, wherein the absorption bandwidth is controlled using different proportions of microwires with different magnetic properties.

9. An absorber according to claim 1, wherein the absorption bandwidth is controlled by varying the distance $e_3$.

10. An absorber according to claim 1, wherein the absorption level is controlled from the microwire density in the absorbent sheet.

11. An absorber according to claim 1, wherein for a given microwire density, control of the thickness $e_2$ allows increasing or decreasing the central frequency absorption level at the expense of decreasing or increasing the bandwidth, respectively.

12. An absorber according to claim 1, wherein the absorption level is controlled by increasing the thickness $e_1$.

13. An absorber according to claim 1, wherein the increase in thickness $e_1$ allows greater stability of the standing wave inside the absorbent sheet.

14. An absorber according to claim 1, wherein the total thickness e of the absorbent sheet is decreased by increasing its dielectric constant.

15. An absorber according to claim 1, wherein the absorber is carried out on different substrates.

* * * * *